ium Patent Office 3,485,650
Patented Dec. 23, 1969

---

3,485,650
USEFUL INFRARED ABSORBING SUBSTANCES FOR PLASTICS OR GLASS
Jerry Peter Milionis, Franklin Township, Somerset County, and Peter Vincent Susi, Middlesex, N.J., assignors to American Cyanamid Company, Stamford, Conn., a corporation of Maine
No Drawing. Original application Jan. 27, 1966, Ser. No. 523,243, which is a continuation-in-part of application Ser. No. 215,791, Aug. 9, 1962. Divided and this application Nov. 1, 1967, Ser. No. 679,666
Int. Cl. C08h *17/44;* C08b *21/04*
U.S. Cl. 106—168                               6 Claims

---

ABSTRACT OF THE DISCLOSURE

A defined class of triarylaminium salts, including certain novel tris(p-dialkylaminophenyl)aminium salts, are useful as infrared absorbers for glass or plastic substrates.

---

This application is a division of application Ser. No. 523,243, filed Jan. 27, 1966, now Patent No. 3,400,156 which, in turn, is a continuation-in-part of application Ser. No. 215,791, filed Aug. 9, 1962 which is now abandoned.

This invention relates to the discovery that certain triarylaminium salts are useful as infrared absorbers, particularly when used in organic plastic substrates. This invention also relates to certain novel tris(p-dialkylaminophenyl)aminium salts which are especially useful for this purpose.

Radiant energy from the sun is frequently grouped into three regions, the near-ultraviolet, the visible and the near-infrared. Together these three regions cover the range of wavelengths from 0.290 micron to about 5.0 microns. Somewhat arbitrarily, the near-ultraviolet spectrum may be considered to cover the region of 0.300–0.400 micron; the visible spectrum, the region of 0.400–0.700 micron; and the near-infrared spectrum, the region of 0.700–5.0 microns.

Heat from the sun is essentially due to the near-infrared radiant energy. Other high temperature bodies, such as tungsten filaments, fluorescent lamps, carbon arcs, etc., also radiate energy in the near-infrared region. For practical purposes, this region often is defined as falling between 0.7 and 5.0 microns, this being the region where common sources of infrared radiation emit substantially all of their infrared energy. Over half of the total radiation energy emited by the sun or electrical lamps lies in the near-infrared region. This is shown in the following tables.

TABLE I.—APPROXIMATE DISTRIBUTION OF RADIANT ENERGY FROM SEVERAL ENERGY SOURCES

| | Percent of total radiant energy emitted | | | |
|---|---|---|---|---|
| | .3–.4$\mu$ | .4–.7$\mu$ | .6–1.6$\mu$ | Above.7$\mu$ |
| Sunlight (reaching earth) | 5 | 42 | 54 | 53 |
| Tungsten lamp, 500 w | 0.1 | 10 | 53 | 90 |
| Fluorescent lamp | 5 | 35 | 28 | 60 |
| Carbon filament heater | | | 1 | 28 | 90 |
| Nonluminous heater | 0 | 0 | 1.3 | 109 |

TABLE II.—APPROXIMATE DISTRIBUTION OF RADIANT ENERGY OF SUNLIGHT

| Region | Percent of total | Percent of infrared |
|---|---|---|
| 0.3–0.4$\mu$ | 5 | |
| 0.4–0.7$\mu$ | 42 | |
| 0.7–1.0$\mu$ | 23 | 43.5 |
| 1.0–1.3$\mu$ | 12 | 22.5 |
| 1.3–1.6$\mu$ | 4.5 | 8.5 |
| 1.6–1.9$\mu$ | 4.5 | 8.5 |
| 1.9–2.7$\mu$ | 5 | 9.5 |
| 2.7–up $\mu$ | 4 | 7.5 |

These tables indicate that within the near infrared region, the greater part of the infrared energy is radiated within the region from about 0.7 to about 2.0 microns. For example, in normal sunlight some two-thirds of the radiant energy is at wavelengths of from about 0.7 to about 1.3 microns. Accordingly, it may be seen that a large proportion of the energy transmitted by our common light sources serves no useful purpose with respect to illumination, but contributes to the development of heat in the material receiving the radiation.

It also may be noted in Table II that some 43–44% of the total infrared radiation in sunlight is in the region just above about 0.7 micron. The latter is about the upper limit of the visible range which, as noted above, usually is defined as from about 0.4 to about 0.7 micron, hence the "near" infrared designation.

In many circumstances it is desirable to filter out non-visible radiations of the near-infrared region without materially diminishing transmission of visible radiations. There are many potential applications for materials that will transmit a major portion of the visible radiations but at the same time be at least semi-opaque to heat-producing infrared radiation, particularly that in the above-noted region of from about 0.7 to about 1.3 microns. Among such possible applications may be mentioned sunglasses, welders' goggles and other eye protective filters, windows, television filters, projection lenses and the like. In many, if not most, of such uses the primary object is to protect the human eye from the adverse effects of radiation in the near infrared. Accordingly, for purposes of this discussion sunglasses will be taken as illustrative.

Glass of most types is substantialy opaque to infrared radiation longer than about five microns. Consequently even when glass can be used, it must be modified to decrease transmission of infrared radiation at from about 0.7 to about 5.0 microns. Various additives have been developed for this purpose, the most usual being metallic oxides such as ferrous oxide. Obviously, when it is necessary or desirable to use an organic plastic substrate which transmits well in the visible region, such additives as are suitable for glass cannot be employed.

Experience has shown that sunglasses, as the illustrative example, should be capable of transmitting at least about 10% of incident visible light shorter than about 0.65 micron. However, to provide adequate protection for the human eye, transmission should be less than forty percent at from about 0.65 to about 0.75 micron and not over about ten percent between about 0.75 and about 0.95 micron. Preferably, at least 20% of visible light will be transmitted. In the two other noted ranges, preferably transmission should not exceed about five percent and one percent respectively.

Other protective optical filters may vary as to requirements in the visible range. In most cases, however, transmission in the near infrared should not exceed the indicated limitations. This applies, for example, not only to other eye protective devices as widely different as welders goggles and window glass, but also to protecting inanimate material as in the case of projection lenses. Optimum protective utility, therefore, ordinarily requires relatively good transmission of radiation below about 0.7 micron but reduced or minimized transmission above that value. Obviously complete cutoff at exactly this, or any other wavelength, is impossible. Nevertheless, for the purposes of this invention, cutoff should be as sharp as possible within a minimum spread of wavelength at about 0.7 micron.

Various organic plastic substrates are available having generally suitable transmission properties in the visible region. Illustrative examples include:

cellulose derivatives such as cellulose nitrate, cellulose acetate and the like; regenerated cellulose and cellulose ethers as for example, ethyl and methyl cellulose;

polystyrene plastics such as polystyrene per se and polymers and copolymers of various ring-substituted styrenes such for example as o-, m- and p-methylstyrene and other ring-substituted styrenes as well as side-chain substituted styrenes such as alpha-, methyl- and ethylstyrene and various other polymerizable and copolymerizable vinylidenes;

various vinyl polymers and copolymers such as polyvinyl butyral and other acetals, polyvinyl chloride, polyvinyl acetate and its hydrolysis products, polyvinyl chloride-acetate copolymers and the like;

various acrylic resins such as polymers and copolymers of methyl acrylate, methyl methacrylate, acrylamide, methylolacrylamide, acrylonitrile and the like;

polyolefins such as polyethylene, polypropylene and the like;

polyesters and unsautrated-modified polyester resins such as those made by condensation of polycarboxylic acids with polyhydric phenols or modified using unsaturated carboxylic acid and further modified by reacting the alkyd with another monomer;

polymers of allyl diglycol carbonate; and various copolymers using as a cross-linking monomer an allyl ester of various acids. Of particular interest and preferred herein as substrates are cellulose acetate, methylmethacrylate, polystyrenes and polymers of alkyl diglycol carbonates.

Any one such substrate may, and usually does, vary from the others very appreciably in its transmission of radiant energy at various wavelengths. Nevertheless, if not modified, none meet the foregoing transmission requirements. Some additive is necessary to decrease the infrared transmission without adversely effecting transmission in the visible range.

To be useful in practical applications, such additive must meet certain requirements, which may be summarized as follows: The additive must exhibit strong absorption in the near-infrared region (particularly in the 0.7 to 1.3 microns region) with little or no absorption in the visible region. Weak absorptions may be tolerated in the visible region, particularly near the edges thereof (viz., near 0.4 and 0.7 micron) where the sensitivty of the human eye is less. However, the fact that a compound possesses the above spectral properties does not, in itself, make such compound a practically useful infrared absorber. In addition, it must possess adequate light stability, heat stability, and compatibility for the intended uses. For use in plastics, compatibility of the additive with such organic polymeric materials is especially important.

The number of organic compounds known to have strong absorption peaks above 0.7 micron is limited. Such organic compounds of this type as have been reported can be roughly grouped into the following classes: (A) metal complexes, (B) fluorenol salts, and (C) polymethines. However, none of these compounds meet all of the requirements mentioned above.

Certain metal complexes are known to have absorption bands in the near-infrared region. In U.S. Patents, 2,971,921 and 3,042,624, the manganous complexes of certain o-nitrosohydroxyaryl compounds and of certain o-hydroxyazobenzene compounds are taught which have absorption bands in the near-infrared region. These compounds, however, also possess stronger absorption peaks in the visible region and are too highly colored for many uses. In U.S. application Ser. No. 320,847, filed Nov. 1, 1963, now abandoned, the nickel complexes of certain triphenylformazans are taught which have absorption bands in the near-infrared region. While these compounds have good light stability and compatibility in plastics, they also have strong absorptions in the visible region and are too highly colored for many uses. In U.S. application Ser. No. 304,626, filed Aug. 26, 1963, now U.S. Patent No. 3,291,746, certain metal phthalocyanines are taught which also possess near-infrared absorption These compounds, which show very good light stability, are highly colored and very insoluble.

Fluorenol salts, such as taught in U.S. Patent No. 3,000,833, possess strong absorption peaks in the near-infrared region. These compounds possess absorption peaks in the visible region, have poor light stability and poor hydrolytic stability, and lack compatibility with plastic materials.

Polymethines, such as taught in U.S. Patent 2,813,802, generally possess high absorption in the near-infrared region with relatively low absorption in the visible region. However, these absorption bands are generally relatively narrow permitting appreciable transmission of near-infrared radiation between them. As the chain length between the terminal carbon atoms of the linear chain joining the aromatic rings is increased, the absorption is shifted further into the near-infrared region with an increase in the intensity of absorption. However, this also decreases the light stability and solubility of these compounds, thus greatly limiting the usefulness of this class of compounds.

These various organic infrared absorbers have been proposed as protective agents for use in organic substrates. Unfortunately, such previously-proposed agents and even combinations of such agents did not prove wholly satisfactory for the illustrative case of protection for the eye against incident radiation in the near infrared. In view of these repeated failures to find an organic infrared absorber which would prove fully satisfactory, it might well be thought that no such compound would be possible. Surprising, in view of such failures, we found that there is a class of compounds which satisfy all the aforementioned requirements.

Compounds of the formula:

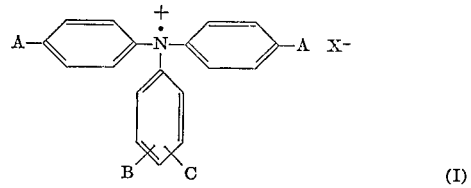

(I)

wherein —A is selected from the group consisting of aryl and

wherein —R' is selected from the group consisting of lower alkyl, cycloalkyl, and benzyl and —R" is selected from the group consisting of —R' and hydrogen and wherein —B and —C are each selected from the group consisting of —A, hydrogen, halogen, hydroxy, lower alkyl, lower alkoxy, and lower alkylmercapto and wherein X⁻ is an anion are triarylaminium salts which do possess the desired protective properties to an unexpectedly high degree. These salts, in accordance with the present invention, when dissolved in suitable solvents or dispersed in transparent plastic materials, display a very high absorption of radiation in the near infrared but only low absorption of radiation in the visible region.

Triarylaminium salts of Formula I may be prepared in organic solvent solution by reacting therein the corresponding triarylamine with a silver salt of a suitable acid. This general method is shown by Neunhoeffer et al.; Ber. 92, 245 (1959).

Suitable silver salts for use in preparing compounds of this invention may be quite widely varied. As noted above, a suitable organic solvent is used as the reaction medium. Acetone is excellent for the purpose. Accordingly, it will be taken as illustrative in the present discussion although the invention is not necessarily so limited. Substantially any stable silver salt may be used if it is soluble in the acetone, or other solvent medium. $X^-$ in (I) will be the anion of the selected silver salt. Illustrative examples include such silver salts as the picrate, benzenesulfonate, ethanesulfonate and the like. However, in accordance with the present invention, salts of halogen-containing acids are preferred. Such salts include, for example, the perchlorate ($ClO_4^-$); fluoroborate ($BF_4^-$); trichloracetate ($CCCl_3CCO^-$); trifluoroacetate ($CF_3COO^-$) and the like.

Of the compounds according to Formula I, a particular subgroup having the formula

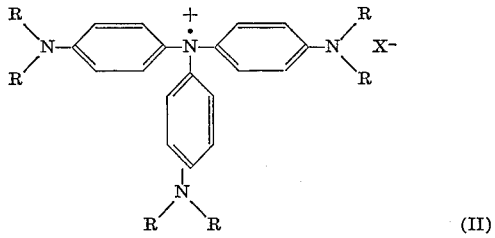

(II)

wherein —R is an alkyl of 2 to 5 carbon atoms and $X^-$ is an anion is a presently preferred subgroup.

As the carbon content of R is increased, the aminium salts of this subgroup according to this invention tend to be more stable. Thus, in use, diethyl compounds are generally more stable than dimethyl compounds and for this reason are preferred. Although tris (p-dimethyl aminophenyl)aminium perchlorate has been previously known, tris(p-diethylaminophenyl)aminium perchlorate is believed to be new as are the fluoroborates, trichloroacetates, trifluoroacetates, picrates and other salts noted above.

In use, aminium salts of the present invention may be incorporated in any suitable plastic or applied on suitable transparent substrates of plastic or glass. This is done by any of several known procedures, including for example; solution casting or dipping; hot milling; burnishing; or by dyeing. Organic plastic material containing the aminium salts can be molded into formed articles such as sheets and plates.

In any method of use, the salts may be incorporated as a barrier layer in or near one surface of a substrate or be disseminated therethrough. Choice of either practice depends on the type of protection used and the physical method used to combine the substrate and the salt or salts.

Either practice can be used to protect the treated material. Either can also be used to form a protective barrier between an object to be protected and the hource of the infrared radiation. In the latter case, protection is usually provided by combining salt and organic substrate in a relatively thin layer or sheet which is then used as the protective barrier. Protection of an object also can be obtained by coating the salts, in a suitable vehicle, directly onto substrates such as glass for formed plastic objects whether to protect the substrate or in forming a protective barrier for other objects.

It is not readily possible to assign limits to the amount which it is desirable to use. In general, the limiting maximum is only an economic one. As to the minimum, it depends on whether the salt is disseminated uniformly through the substrate or is concentrated in a barrier layer of the same or a different substrate. When disseminated through a substrate, usually to protect the latter, there should be provided at least about 0.01 weight percent of the substrate. When concentrated in a barrier layer there should be at least 0.01 gram per square foot of surface.

The invention will be further illustrated in conjunction with the following specific examples which are intended for that purpose only. Therein, unless otherwise noted, all parts and percentages are by weight and all temperatures are expressed in degrees centigrade.

EXAMPLE 1

Tris(p-dimethylaminophenyl)aminium perchlorate

To 3.74 parts (0.01 mole) of tris(p-dimethylaminophenyl)amine in 200 parts of dry acetone there was added 45 parts by volume (0.009 mole) of 0.2 N silver perchlorate solution in acetone. The mixture was stirred for 30 minutes and then filtered from the precipitated silver. Ether is added to the filtrate, and the product, which precipitates as a green solid, is filtered off and dried. (Weight 3.75 parts.)

*Analysis.*—Calc'd for $C_{24}H_{30}N_4ClO_4$: N, 11.8. Found: N, 12.1.

EXAMPLE 2

Tris(p-dimethylaminophenyl)aminium fluoborate

To a solution of 2.24 parts (0.006 mole) of tris(p-dimethylaminophenyl)amine in 120 parts of acetone there was added 27 parts by volume (0.0054 mole) of 0.2 N silver fluoborate solution in acetone. The reaction mixture was stirred for 30 minutes, and the product (1.73 parts) melting at 155–156° C., was separated by the procedure used in Example 1.

*Analysis.*—Calc'd for $C_{24}H_{30}N_4BF_4$: C, 62.5; H, 6.56; N, 12.2. Found: C, 62.6; H, 6.70; N, 12.3.

EXAMPLE 3

Tris(p-diethylaminophenyl)aminium fluoborate

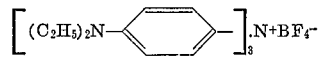

To a solution of 0.6 part (0.0013 mole) of tris(p-diethylaminophenyl)amine in about 25 parts of acetone there was added 6 parts by volume (0.0012 mole) of 0.2 N silver fluoborate solution in acetone. After standing overnight, the reaction mixture was filtered and the filtrate was evaporated to dryness. The residue was a green solid.

*Analysis.*—Calc'd for $C_{30}H_{42}N_4BF_4$: N, 10.3. Found: N, 10.5.

EXAMPLE 4

Tris(p-diethylaminophenyl)aminium perchlorate

The procedure of Example 3 was followed substituting 6 parts by volume of 0.2 N silver perchlorate solution in acetone for the silver fluoborate solution. The product was obtained as a glassy, green solid.

EXAMPLE 5

Tris(p-di-n-butylaminophenyl)aminium fluoborate

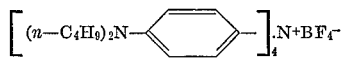

The process of Example 3 was used substituting 1.4 parts of tris(p-di-n-butylaminophenyl)amine for the corresponding ethyl compound and employing equivalent amounts of the other reactants. The product (1.5 parts) was dark green.

*Analysis.*—Cal'd for $C_{42}H_{66}N_4BF_4$: N, 7.9. Found: N, 7.6.

EXAMPLES 6–23

Aminium salts of the following formula were prepared by the procedure of Example 3 substituting the corresponding amine for the tris(p-diethylaminophenyl)amine used therein and employing the silver salt corresponding to the anion of the aminium salt.

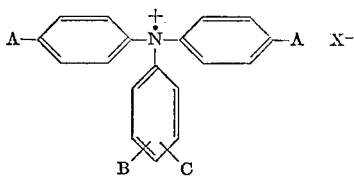

(I)

The product compounds are shown by Table III.

TABLE III

| Example | A | B | C | X |
|---|---|---|---|---|
| 6 | Diethylamino | m-Diethylamino | Hydrogen | $SbF_6$ |
| 7 | Cyclohexylamino | p-Cyclohexylamino | do | $SbF_6$ |
| 8 | Dibenzylamino | p-Dibenzylamino | do | $SbF_6$ |
| 9 | Diethylamino | m-Fluoro | do | $SbF_6$ |
| 10 | do | o-Methoxy | do | $SbF_6$ |
| 11 | do | Hydrogen | do | $SbF_6$ |
| 12 | do | p-Hydroxy | do | $SbF_6$ |
| 13 | do | p-Methoxy | m-Methoxy | $SbF_6$ |
| 14 | do | m-Hydroxy | Hydrogen | $SbF_6$ |
| 15 | do | p-Methoxy | do | $SbF_6$ |
| 16 | do | m-Methoxy | do | $SbF_6$ |
| 17 | do | m-Methylthio | do | $SbF_6$ |
| 18 | do | o-Methylthio | do | $SbF_6$ |
| 19 | do | p-Methylthio | do | $SbF_6$ |
| 20 | Butylamino | p-Butylamino | do | $BF_4$ |
| 21 | Phenyl | Phenyl | do | $ClO_4$ |
| 22 | Diethylamino | p-Diethylamino | o-Methyl | $BF_4$ |
| 23 | do | do | do | $AsF_6$ |

EXAMPLE 24

Spectral absorption curves of the solutions in methanol of aminium salts of Examples 1 to 5 were determined in the visual and near infrared regions at from 0.35 to 2.00 microns. For this purpose a recording spectrophotometer fitted with a near-infrared attachment and a tungsten light source, is used. The wavelength of maximum absorbance ($\lambda_{max}$) is determined from the curve. Absorptivity at the wavelength of the maximum absorption, designated ($a_{max}$), is an expression of the degree of absorption. It is calculated using the following relationship:

$$a_{max} = \frac{1}{bc} \log \frac{T_o}{T}$$

wherein:
$a$ = absorptivity
$b$ = the thickness of the cell (spectrophotometer) in cm.
$c$ = the concentration in grams per liter
$T$ = transmittance of light passing through the solution
$T_o$ = transmittance of light passing through the solvent in the same cell.

Molar absorptivity at the wavelength of maximum absorption ($\epsilon_{max}$) is an expression of the degree of absorption. It is calculated using the following relationship:

$$\epsilon_{max} = \frac{M}{bc} \log \frac{T_b}{T} = Ma$$

wherein:
$\epsilon$ = molar absorptivity
$M$ = molecular weight of the solute.

Therefore, $\epsilon_{max}$ is the strength of absorption based on a molar concentration of 1-gram-mol of compound per liter of solution, or it may be considered a measure of absorption of each gram-mol of compound. The larger the value of $\epsilon_{max}$, the greater is the absorption. Illustrative results are given in the following Table IV.

TABLE IV

| Aminium salt | ($\lambda_{max}$) (m$\mu$) | ($a_{max}$) | ($\epsilon_{max}$) |
|---|---|---|---|
| Example 1 | 960 | 80.1 | 38,000 |
| Example 2 | 960 | 119 | 54,000 |
| Example 3 | 960 | 77 | 42,000 |
| Example 4 | 960 | 56.9 | 31,800 |
| Example 5 | 980 | 44 | 31,400 |

EXAMPLE 25

Thin films of cellulose acetate were prepared by dipping a glass microscope slide into about 50 ml. of an acetone stock solution of the plastic to which was added a sufficient quantity of the product of Example 1 to produce the desired amount of infrared absorption. This procedure was repeated for the products of Examples 2 and 3. The slides were allowed to "dry" slowly at about 50° C. leaving a thin coating on both sides of each glass slide of about 5–10 mils thickness. Spectral transmittance curves of the plastic films were obtained with a recording spectrophotometer. Percent transmittance of the incident radiation of wavelength 960 m$\mu$, the wavelength of maximum absorbance in the infrared region, and of wavelength 550 m$\mu$, the median wavelength of the visible light region of the spectrum, are shown in Table V.

The plastic films were exposed in a Fade-Ometer for 15 hours and the percent transmittance at 960 m$\mu$ was again measured. The percent of the original absorbance at 960 m$\mu$ remaining was calculated as the measure of remaining activity.

Absorbance is defined as log T.

Percent original absorbance $$= \frac{\text{Absorbance after exposure}}{\text{Absorbance originally}} \times 100$$

Illustrative results are shown in the following Table V.

TABLE V

| Aminium salt | Percent transmittance | | Percent of Original Absorbance[1] |
|---|---|---|---|
| | 960 m$\mu$ | 550 m$\mu$ | |
| Example 1 | 15 | 88 | 40 |
| Example 2 | 27 | 88.5 | 43.5 |
| Example 3 | 18 | 90 | 60 |

[1] (After 15 hours in Fade-Ometer.)

EXAMPLE 26

Thin films of poly(methyl methacrylate) were prepared by dipping a glass microscope slide into about 50 ml. of an acetone stock solution of the plastic to which was added a sufficient quantity of the product of Example 1 to produce the desired amount of infrared absorption. This procedure was repeated for the products of Examples 2 and 3. The slide was allowed to "dry" slowly at about 50° C. leaving a thin coating on both sides of each glass slide of about 5–10 mils thickness. Spectral transmittance curves of the plastic films were obtained as described above under Example 25. Illustrative results are shown in Table VI.

325-mesh) compound onto the surface with a soft cotton cloth. This is a burnishing technique. In some cases, the burnished samples were overcoated. Illustrative results of transmission measurements at the wavelength of peak visual light (VS) transmittance and wavelength in the near-infrared region (NIR) are shown in the following Table VIII.

TABLE VIII

| Surface | Aminium Salt | Overcoating | Percent transmittance | |
|---|---|---|---|---|
| | | | Peak VS | NIR |
| Plastic [1] | Ex. 2 | None | 29% at 575 mμ | 0.5% at 900–1,000 mμ. |
| Do.[1] | Ex. 1 | Alkyd resin | 72% at 575 mμ | 42% at 970 mμ. |
| Glass | Ex. 1 | Mineral oil | 72% at 650 mμ | 31% at 980 mμ. |

[1] Poly(methylmethacrylate).

TABLE VI

| Aminium salt | Percent transmittance | |
|---|---|---|
| | 960 mμ | 550 mμ |
| Example 1 | 10 | 84 |
| Example 2 | 8 | 87 |
| Example 3 | 16 | 8 |

Examples 25 and 26 show that a very large proportion of the infrared radiation at the wavelength of maximum absorption is absorbed. Also, these examples show that most of the visible light is transmitted. Example 25 shows that the diethylamino derivatives has more resistance to "fading", i.e., is more durable to ultraviolet light, than the dimethylamino derivatives.

EXAMPLE 27

Cellulose acetate and poly(methylmethacrylate) chips or plates containing the products of Examples 1–3 uniformly dispersed therein were prepared. Between 0.02 and 0.2 part of aminium salt was used to 100 parts of semi-molten plastic on a two-roll mill heated at about 170° C. Mixing was accomplished by continuously stripping off and passing the plastic mass between the rolls for 10 to 20 passes. The resulting plastic mass was then compression molded into smooth, transparent chips or plates of about 50–100 mils thickness. Illustrative results of transmittance measurements are shown in Table VII.

EXAMPLE 29

Pieces of transparent, cast poly(methylmethacrylate) and partially polymerized alkyl diglycol carbonate with Shore D hardness of about 45 were treated with the product of Example 1 by a "dyeing" technique. The dyeings were made by immersing pieces of the plastic in baths comprising ethanol-water solutions of the aminium salt (0.1–0.5 g. per 50 ml. of solution) and 2–3 ml. of a 48% emulsion of methyl salicylate. The baths containing the plastic pieces were heated in a steam bath for 1–3 hours. Illustrative results of transmission measurements are shown in Table IX.

TABLE IX

| Plastic | Percent transmittance at 960 mμ |
|---|---|
| Poly(methylmethacrylate) | 5 |
| Poly(allyl diglycol carbonate) (fresh polymer) | 0 |
| Poly(ally diglycol carbonate) polymer 6 days old) | 10 |

EXAMPLE 30

The procedure of Example 25 was followed using the product of Example 5. The wavelength of maximum absorbance in the infrared region is 980 mμ. The exposure in the Fade-Ometer was for 20 hours.

Percent transmittance:
 980 mμ _____ 13
 550 mμ _____ 87
Percent of original absorbance _____ 65

EXAMPLE 31

Using the procedure of Example 24 and the aminium salts of Examples 6–23, the wavelengths of maximum

TABLE VII

| Plastic | Aminium Salt | | Thickness of chips, mils | Percent transmittance | |
|---|---|---|---|---|---|
| | Kind | Wt. percent | | 960 mμ | 550 mμ |
| Cellulose acetate | Ex. 1 | 0.02 | 109 | 4 | 43 |
| Poly(methylmethacrylate) | Ex. 1 | 0.05 | 65 | 5 | 52 |
| Do | Ex. 1 | 0.20 | 65 | 6 | 56 |
| Do | Ex. 2 | 0.05 | 67 | 8 | 71 |
| Do | Ex. 3 | 0.05 | 67 | 0 | 80 |

EXAMPLE 28

Very thin reflecting or specular coatings of the pure, solid aminium salt were made on the surfaces of glass and plastic plates by rubbing the finely divided (less than 325-mesh) absorbance in the visual and near infrared regions at from 0.35 to 2.00 microns were determined. The measurements were made using solutions of the aminium salts in acetone or methanol. The results are given in Table X.

TABLE X

| Aminium salt | Solvent | ($\lambda_{max}$) (m$\mu$) | ($a_{max}$) | ($\epsilon_{max}$) |
|---|---|---|---|---|
| Example 6 | Acetone | 1,070 | 19.1 | 13,300 |
|  |  | 560 | 3.6 | 2,500 |
| Example 7 | do | 925 | 50.3 | 38,800 |
|  |  | 395 | 22.9 | 17,700 |
| Example 8 | do | 955 | 42.0 | 46,000 |
|  |  | 395 | 18.4 | 20,200 |
| Example 9 | do | 1,130 | 30.1 | 19,200 |
|  |  | 555 | 6.6 | 4,200 |
| Example 10 | do | 1,085 | 30.9 | 20,200 |
|  |  | 550 | 4.9 | 3,200 |
| Example 11 | do | 1,070 | 48.5 | 30,200 |
|  |  | 570 | 8.3 | 5,200 |
| Example 12 | do | 1,025 | 19.7 | 12,600 |
|  |  | 680 | 8.6 | 5,500 |
| Example 13 | do | 1,030 | 48.2 | 32,900 |
|  |  | 735 | 11.2 | 7,700 |
| Example 14 | do | 1,070 | 39.7 | 25,400 |
|  |  | 590 | 4.9 | 3,100 |
| Example 15 | do | 1,025 | 40.9 | 26,800 |
|  |  | 630 | 7.9 | 5,200 |
| Example 16 | do | 1,075 | 39.8 | 26,000 |
|  |  | 570 | 5.9 | 3,900 |
| Example 17 | do | 1,080 | 36.7 | 24,900 |
|  |  | 555 | 5.7 | 3,800 |
| Example 18 | do | 1,110 | 38.9 | 26,000 |
|  |  | 535 | 5.6 | 3,700 |
| Example 19 | do | 1,050 | 37.5 | 25,100 |
|  |  | 680 | 6.9 | 4,600 |
| Example 20 | do | 920 | 76.8 | 41,800 |
| Example 21 | do | 827 | 44.3 | 25,400 |
| Example 22 | do | 1,000 | 89.3 | 50,000 |
| Example 23 | do | 1,000 | 55.1 | 36,400 |

This example shows that the compounds absorb in the near infrared and that the absorbance in the visual range is considerably less than in the near infrared range.

EXAMPLE 32

Thin films of cellulose acetate containing the products of Examples 6–11 and 15–19 were prepared by the procedure of Example 25. Spectral transmittance curves of the plastic films were obtained with a recording spectrophotometer as in Example 25. The wavelength of maximum absorbance ($\lambda_{max}$.) in the infrared region of the spectrum is shown in Table XI.

TABLE XI

| Aminium salt: | ($\lambda_{max}$.), m$\mu$ |
|---|---|
| Example 6 | 1080 |
| Example 7 | 930 |
| Example 8 | 960 |
| Example 9 | 1140 |
| Example 10 | 1100 |
| Example 11 | 1080 |
| Example 15 | 1040 |
| Example 16 | 1100 |
| Example 17 | 1090 |
| Example 18 | 1120 |
| Example 19 | 1060 |

This example shows the compounds are compatible with the plastic substrate, and that when incorporated in the substrate, the compounds show a maximum absorbance in the near infrared.

EXAMPLE 33

Plastic films from Example 32 were exposed in a Fade-Ometer for 25 hours and the percent transmittance at the wavelength of maximum absorbance in the near infrared was measured before and after exposure in the Fade-Ometer. The percent of the original absorbance remaining was calculated by the formula in Example 25. The results are shown in Table XII.

TABLE XII

| Aminium salt: | Percent of original absorbance |
|---|---|
| Example 6 | 65 |
| Example 7 | 78 |
| Example 8 | 82 |

We claim:
1. A composition of matter comprising an organic polymeric material capable of transmitting at least about 10% of incident visible light shorter than about 0.65 micron and having incorporated therein at least 0.01 weight percent of a compound of the formula

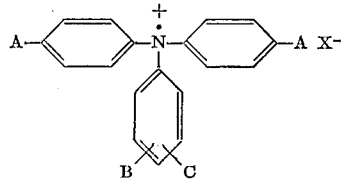

wherein —A is selected from the group consisting of aryl and $$-N\begin{matrix}R'\\R''\end{matrix}$$

wherein —R' is selected from the group consisting of lower alkyl, cycloalkyl, and benzyl and —R" is selected from the group consisting of —R' and hydrogen and wherein —B and —C are each selected from the group consisting of —A, hydrogen, halogen, hydroxy, lower alkyl, lower alkoxy, and lower alkylmercapto and wherein X⁻ is an anion.

2. A composition as defined in claim 1 wherein said compound is a tris(lower dialkylaminophenyl) aminium salt.

3. A composition as defined in claim 2 wherein said salt is a tris(diethylaminophenyl)aminium salt.

4. A composition of matter comprising a substrate selected from the group consisting of an organic polymeric material and glass and which is capable of transmitting at least about 10% of incident visible light shorter than about 0.65 micron, said substrate having coated on at least one surface thereof at least 0.01 gram per square foot of a compound of the formula

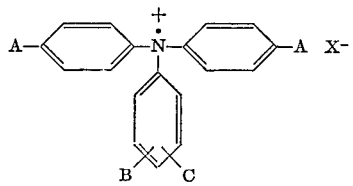

wherein —A is selected from the group consisting of aryl and $$-N\begin{matrix}R'\\R''\end{matrix}$$

wherein —R' is selected from the group consisting of lower alkyl, cycloalkyl, and benzyl and —R" is selected from the group consisting of —R' and hydrogen and wherein —B and —C are each selected from the group consisting of —A, hydrogen, halogen, hydroxy, lower alkyl, lower alkoxy, and lower alkylmercapto and wherein X⁻ is an anion.

5. A composition as defined in claim 4 wherein said compound is a tris(lower dialkylaminophenyl)aminium salt.

6. A composition as defined in claim 5 wherein said salt is a tris(diethylaminophenyl)aminium salt.

References Cited

UNITED STATES PATENTS 1,485,655  3/1924  Wells _____ 252—300
1,604,761  10/1926  Sherts _____ 252—300
2,905,570  9/1959  Hawthorne et al. ____ 252—300
2,952,575  9/1960  Baltzer _____ 252—300

ALLAN LIEBERMAN, Primary Examiner

H. H. FLETCHER, Assistant Examiner

U.S. Cl. X.R.

106—186, 195, 196, 197; 117—33.3, 124, 138.8, 161; 252—300; 260—45.9, 576